United States Patent
Brown (10) Patent No.: US 12,169,539 B2
(45) Date of Patent: Dec. 17, 2024

(54) APPARATUS, SYSTEM AND METHOD FOR APPLICATION-SPECIFIC BIOMETRIC PROCESSING IN A COMPUTER SYSTEM

(71) Applicant: ALLSCRIPTS SOFTWARE, LLC, Chicago, IL (US)

(72) Inventor: Joshua Brown, Fuquay Varina, NC (US)

(73) Assignee: Allscripts Software, LLC, Chicago, IL (US)

( * ) Notice: Subject to any disclaimer, the term of this patent is extended or adjusted under 35 U.S.C. 154(b) by 479 days.

(21) Appl. No.: 16/225,833

(22) Filed: Dec. 19, 2018

(65) Prior Publication Data
US 2020/0204365 A1    Jun. 25, 2020

(51) Int. Cl.
*G06F 21/32* (2013.01)
*H04L 9/08* (2006.01)
*H04L 9/32* (2006.01)

(52) U.S. Cl.
CPC ............ *G06F 21/32* (2013.01); *H04L 9/0863* (2013.01); *H04L 9/0866* (2013.01); *H04L 9/3231* (2013.01)

(58) Field of Classification Search
None
See application file for complete search history.

(56) References Cited

U.S. PATENT DOCUMENTS

| | | | |
|---|---|---|---|
| 6,134,661 A * | 10/2000 | Topp | G06F 21/31 345/168 |
| 8,006,298 B1 * | 8/2011 | Balasubramanian | G06F 21/31 726/18 |
| 2006/0075256 A1 * | 4/2006 | Hagiwara | G06F 21/32 713/186 |
| 2009/0282258 A1 * | 11/2009 | Burke | G06F 21/46 713/184 |
| 2009/0307164 A1 * | 12/2009 | Baughman | G06N 3/0472 706/20 |
| 2010/0138914 A1 * | 6/2010 | Davis | H04L 9/3231 726/19 |

* cited by examiner

*Primary Examiner* — Benjamin E Lanier
(74) *Attorney, Agent, or Firm* — Peter Zura; LOZA & LOZA, LLP (57) ABSTRACT

Technologies and techniques for biometrically authenticating a user for an apparatus. User biometric data is generated via a biometric capture device. A processor processes the user biometric data to generate one or more biometric templates. A memory stores the biometric templates and one or more previously generated biometric templates. A biometric manager module associates executable applications with respective biometric templates, wherein the processor matches one of the biometric templates with the previously generated biometric templates to determine if the matched biometric template is associated with the executable application. The processor generates at least one of a password and/or a cryptographic key for allowing access to the associated executable application based on the matched biometric template.

20 Claims, 7 Drawing Sheets

|                  |              |
|------------------|--------------|
| Template 01 702  | Key 01 706   |
| Template 02 704  |              |

App 01 750    App 02 752

| Key 02 708 |
|------------|
| Key 03 710 |

App 03 754

App 01 750    App 02 752    App 03 754

| Template 01 702 | Password 01 714 | Password 02 716 | Password 04 720 |
|-----------------|-----------------|-----------------|-----------------|
| Template 02 704 |                 | Password 03 718 |                 |

FIG. 7B

APPARATUS, SYSTEM AND METHOD FOR APPLICATION-SPECIFIC BIOMETRIC PROCESSING IN A COMPUTER SYSTEM

FIELD OF TECHNOLOGY

The present disclosure is directed to technologies and techniques for biometric processing in a computer system. More specifically, the present disclosure is directed to biometric processing in a computer system that allows multiple passwords and/or cryptographic keys to be used in application-specific environments.

BACKGROUND

The field of biometrics is directed to the recognition of individuals by means of unique physiological and/or behavioral characteristics. In practical systems, several biometric modalities are used, such as fingerprint, face, iris, hand geometry, and so forth. Recently, biometric systems are becoming increasingly popular because they potentially offer more secure solutions than other identification means such as PIN codes and security badges because a biometric is tightly linked to an individual. For the same reason, biometrics can prevent the use of several identities by a single individual. Finally, biometrics are also more convenient because, unlike passwords and PIN codes, they cannot be forgotten and are always at hand.

One of the drawbacks of conventional biometrics systems is that the biometric measurements and data are typically configured to be specific to a device, wherein the device may use the biometric data only for applications on the device that are specifically configured to process the biometric data. Additionally, there is insufficient flexibility in biometric computer systems to allow such systems to attribute biometric data to different application-specific environments, regardless of whether or not those applications are configured to process the biometric data. Additionally, improved security and flexibility is needed for managing cryptographic information associated with the biometric data. These and other drawbacks cause inefficiency in the computer system, and limit the range of applications for biometric technology.

SUMMARY

Various apparatus, systems and methods are disclosed herein relating to application-specific biometric processing.

In one example, an apparatus for biometrically authenticating a user is disclosed, comprising: a biometric capture device configured to generate user biometric data; a processor, operatively coupled to the biometric capture device, wherein the processor is configured to process user biometric data from the biometric capture device to generate one or more biometric templates; an application module, configured to store one or more executable applications; a memory, operatively coupled to the processor, wherein the memory is configured to store the one or more biometric templates and one or more previously generated biometric templates; and a biometric manager module, wherein the biometric manager module is configured to associate one of the executable applications with one of the one or more biometric templates, wherein the processor is configured to match one of the one or more biometric templates with one of the one or more previously generated biometric templates to determine if the matched biometric template is associated with the executable application, and wherein the processor is configured to generate at least one of a password and/or a cryptographic key for allowing access to the associated executable application based on the matched biometric template.

In another example, a method is disclosed for biometrically authenticating a user for an apparatus, comprising: generating user biometric data via a biometric capture device; processing, via a processor, user biometric data from the biometric capture device to generate one or more biometric templates; storing, in a memory, the one or more biometric templates and one or more previously generated biometric templates; and associating, via a biometric manager module, one of executable applications for the apparatus with one of the one or more biometric templates, matching, via the processor, one of the one or more biometric templates with one of the one or more previously generated biometric templates to determine if the matched biometric template is associated with the executable application, and generating, via the processor, at least one of a password and/or a cryptographic key for allowing access to the associated executable application based on the matched biometric template.

In another example, a system is disclosed for biometrically authenticating a user, comprising: a biometric capture device configured to generate user biometric data; a processor, operatively coupled to the biometric capture device, wherein the processor is configured to process user biometric data from the biometric capture device to extract feature vectors of the biometric templates and convert the vectors for form binary strings to generate one or more biometric templates therefrom; an application module, configured to store one or more executable applications that are not configured to receive biometric data for access; a memory, operatively coupled to the processor, wherein the memory is configured to store the one or more biometric templates and one or more previously generated biometric templates; and a biometric manager module, wherein the biometric manager module is configured to associate one of the executable applications with one of the one or more biometric templates, wherein the processor is configured to match one of the one or more biometric templates with one of the one or more previously generated biometric templates to determine if the matched biometric template is associated with the executable application, and wherein the processor is configured to generate at least one of a password and/or a cryptographic key for allowing access to the associated executable application based on the matched biometric template.

BRIEF DESCRIPTION OF THE FIGURES

The present invention is illustrated by way of example and not limitation in the figures of the accompanying drawings, in which like references indicate similar elements and in which.

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C #, Java, Actionscript, Swift, Objective-C, Javascript, CSS, XML, etc.). Furthermore, the term "information" as used herein is to be understood as meaning digital information and/or digital data, and that the term "information" and "data" are to be interpreted as synonymous.

In addition, while conventional hardware components may be utilized as a baseline for the apparatuses and systems disclosed herein, those skilled in the art will recognize that the programming techniques and hardware arrangements disclosed herein, embodied on tangible mediums, are configured to transform the conventional hardware components into new machines that operate more efficiently (e.g., providing greater and/or more robust data, while using less processing overhead and/or power consumption) and/or provide improved user workspaces and/or toolbars for human-machine interaction.

Figure 1:
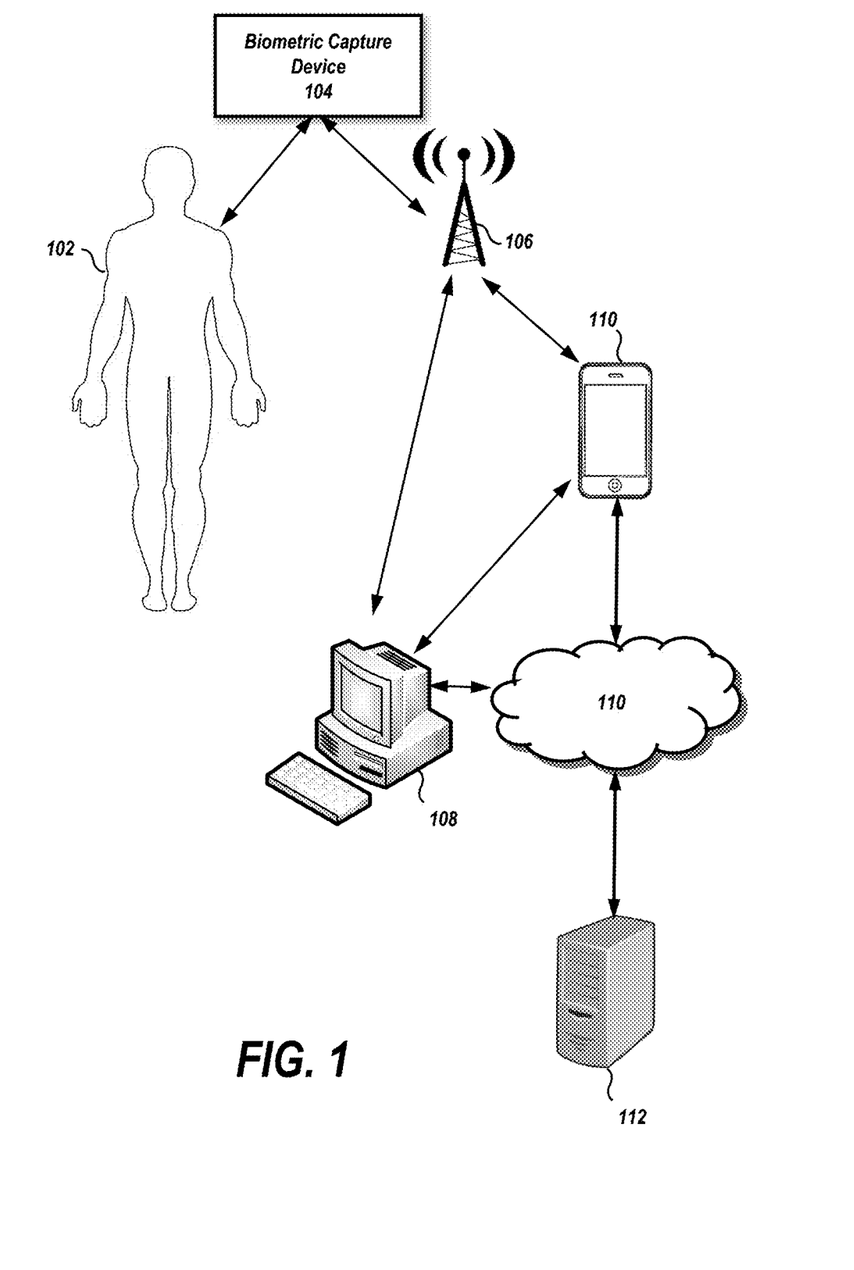
FIG. 1 illustrates a simplified overview of a processor-based computer system configured to perform biometric processing under an illustrative embodiment.

Turning to FIG. 1, a system 100 is shown for biometric processing under an illustrative embodiment, wherein a biometric capturing device 104 is configured to sense, capture and/or receive a biometric reading from a user 102. In some illustrative embodiments, biometric capturing device 104 may be a stand-alone device. In some illustrative embodiments, biometric capturing device 104 may be coupled or integrated as a sensor into a processing device (e.g., 108, 110). The biometric capturing device may be configured to performing automated methods of verifying or recognizing the identity of a living person based on a physiological or behavioral characteristic. These characteristics include, but are not limited to, fingerprints, facial images, iris, and voice recognition. The biometric data captured from device 104 may be transmitted, via wired connection or wireless connection via antenna 106 to portable processing device 110 and/or processing device 108. These devices include, but are not limited to, cell phones, tablets, laptops, personal computers, workstations, medical processing devices, and the like. Portable processing device 110 and processing device 108 may communicate data, including biometric data, with each other and/or with a computer network 110, which is communicatively coupled to a server 112. While only two processing/computing devices are shown in the figure, those skilled in the art will recognize that any number of suitable computing devices may be coupled to network 110. Similarly, server 112 may be configured as a stand-alone server, or may be part of a server network that includes a plurality of server, or a cloud server network.

Figure 2:
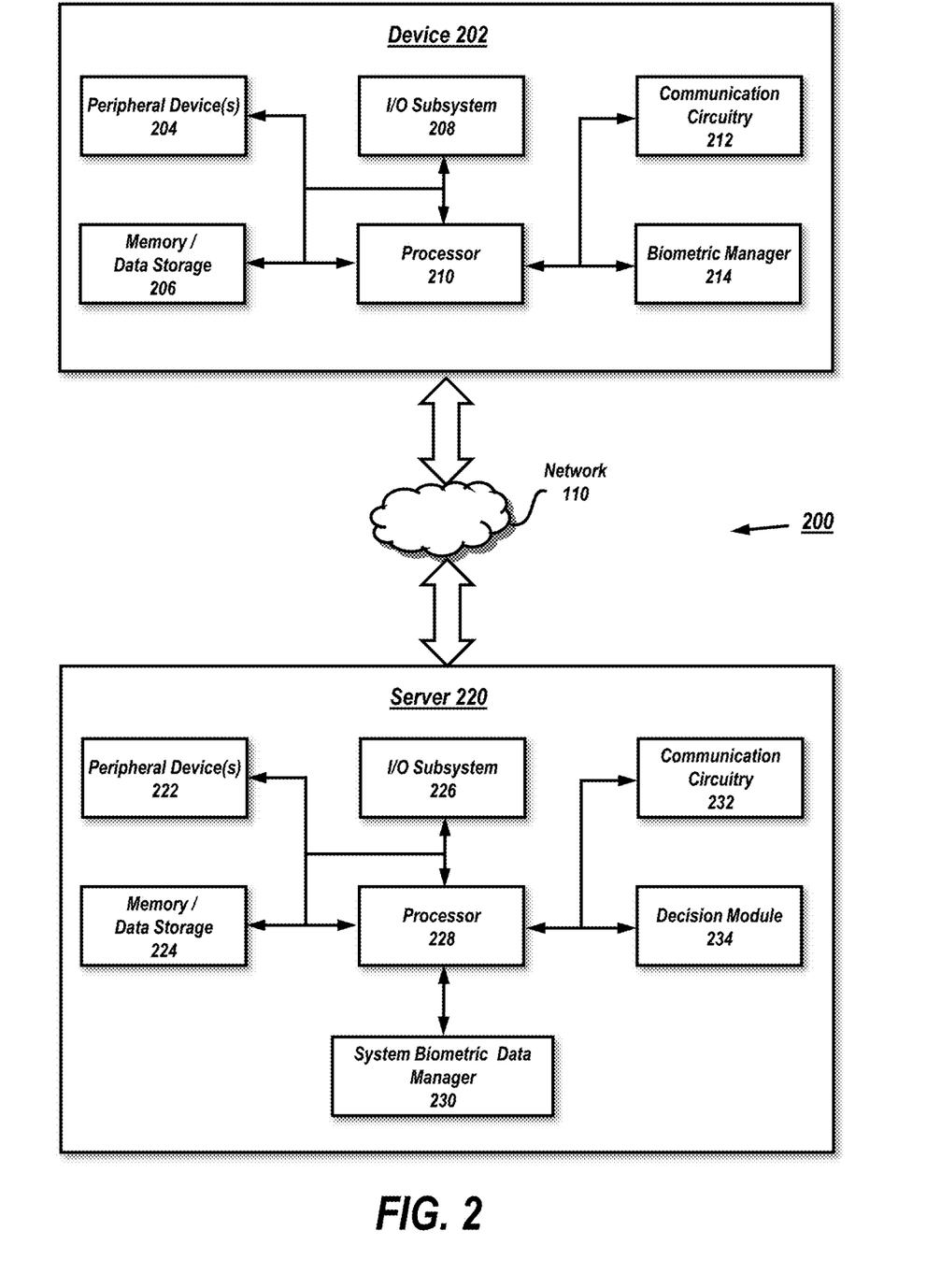
FIG. 2 shows an operating environment for a device and a server for processing biometric data and cryptographic data under an illustrative embodiment.

FIG. 2 shows an operating environment 200 for system 100 that includes a processing device 202, which may be configured as any of computer devices 108, 110, and a server 220, which may be configured as server 112, communicating via the network 110, wherein the operating environment is configured to process biometric data as explained in further detail below. In the illustrative embodiment, the processing device 202 includes a processor 210 or processor circuit, one or more peripheral devices 204, memory/data storage 206, communication circuitry 212, input/output (I/O) subsystem and biometric manager module 216.

Biometric manager module 214 may be configured to process biometric data to form biometric templates that may be used for matching. Biometric manager module 214 may also be configured to perform cryptographic processing on the biometric data and data received from other modules in the operating environment 200, such as system biometric data manager 230. The biometric manager module 214 may be configured to perform verification and identification of individuals. In verification, a person claims to have a certain identity and the biometric manager module 214 may be configured to perform a 1:1 comparison between the offered biometric and the biometric reference information (e.g., template) that is linked to the claimed identity and stored in the biometric system (e.g., 306, 224).

In identification, a 1:N comparison is performed between the offered biometric template and all available reference information stored in the biometric system to reveal the identity of an individual. During enrollment, the biometric capture device 104 (which may be coupled to or integrated into device 202) may measure a biometric. After processing the measurement data and extracting relevant features via feature extraction, a template representing the measurement is generated by biometric manager module 214 and stored in the biometric system (e.g., 206, 224). During verification, an individual claims an identity, and a biometric measurement from this individual is obtained. This measurement is transformed into a template and compared (matched) with the template stored in the biometric system (e.g., 206, 224) corresponding to the claimed identity and an "accept" or "reject" decision is made in the system.

Biometric manager module 214 may also be configured to link to specific applications (e.g., see 314 of FIG. 3) and further associate specific biometric data with cryptographic keys and passwords. Biometric manager module 214 may be configured to perform comparison or matching of biometric templates, wherein, in one illustrative embodiment, biometric templates are treated as a statistical classification process that determines if a measured template is drawn from the probability distribution of the claimed identity (the genuine distribution) or from the distribution describing all other individuals (the impostor distribution or background distribution). Accordingly, in this example, biometric manager module 214 may represent a biometric template as a feature vector that is an observation of a stochastic variable, where a plurality of classes are associated with probability density functions. A decision criterion based on a posteriori probabilities chooses the class that is most probable for matching. In order to evaluate the performance of a given decision rule or classification boundary, a probability of error may be determined using a False Accept Rate (FAR) and/or False Reject Rate (FRR) that may be based off of Gaussian distribution and/or Euclidean distance. In some illustrative embodiment, the feature vectors of the biometric templates may be represented as binary strings.

In addition, biometric manager module 214 may be configured to perform cryptographic processing on biometric templates, as well as perform cryptographic processing provided by other devices (e.g., server 220). In some illustrative embodiments, a symmetric key encryption scheme (e.g., similar to a public-key scheme) may be used, where device 202 (and/or biometric capture device 104) receive or generate a secret key that is equal to the secret key of a verifying entity. During enrollment, a biometric template f of a person is obtained, f is encrypted with the key K, and EK(f) is stored in the memory/data storage (206). During verification, the measurement of the same biometric results in the value f, where the device (and/or biometric capture device 104) encrypts the value f with the key K and sends EK(f) for verification.

In one advantageous embodiment, biometrics can be represented as real-valued feature vectors in a high-dimensional space. Utilizing biometric manager module 214, the feature vectors are then processed to represent the feature vectors as binary strings. In this example, the biometric manager module 214 may include a quantizer, a key extractor and a cryptographic protocol, where the quantizer is configured to transform feature vectors into binary strings that are transmitted to the extractor that extracts or generates a key based on a given binary string. In some illustrative embodiments, the quantizer may be configured to generate metadata or side information during enrollment for use in verification. Thus, given a binary representation of a biometric, the extractor may be configured to extract a key K, and generate the same key K for successive inputs having a predetermined threshold distance or metric (e.g., Hamming distance, Euclidean distance, Damerau-Levenshtein distance, etc.) from the previous or original input. Such a configuration advantageously provides a classifier that minimizes noise influences of raw biometric data inputs.

In some illustrative embodiments, biometric manager module 214 may be incorporated into memory/data storage 206 with or without a secure memory area, or may be a dedicated component, or incorporated into the processor 210. Of course, processing device 202 may include other or additional components, such as those commonly found in a digital apparatus and/or computer (e.g., sensors, various input/output devices), in other embodiments. Additionally, in some embodiments, one or more of the illustrative components may be incorporated in, or otherwise form a portion of, another component. For example, the memory/data storage 206, or portions thereof, may be incorporated in the processor 210 in some embodiments.

The processor 210 may be embodied as any type of processor currently known or developed in the future and capable of performing the functions described herein. For example, the processor 210 may be embodied as a single or multi-core processor(s), digital signal processor, microcontroller, or other processor or processing/controlling circuit. Similarly, memory/data storage 206 may be embodied as any type of volatile or non-volatile memory or data storage currently known or developed in the future and capable of performing the functions described herein. In operation, memory/data storage 206 may store various data and software used during operation of the processing device 210 such as access permissions, access parameter data, operating systems, applications, programs, libraries, and drivers.

Memory/data storage 206 may be communicatively coupled to the processor 210 via an I/O subsystem 208, which may be embodied as circuitry and/or components to facilitate input/output operations with the processor 210, memory/data storage 206, and other components of the processing device 202. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 208 may form a portion of a system-on-a-chip (SoC) and be incorporated, along with the processor 210, memory/data storage 206, and other components of the processing device 202, on a single integrated circuit chip.

The processing device 202 includes communication circuitry 212 (communication interface) that may include any number of devices and circuitry for enabling communications between processing device 202 and one or more other external electronic devices and/or systems. Similarly, peripheral devices 204 may include any number of additional input/output devices, interface devices, and/or other peripheral devices. The peripheral devices 204 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 220 may be embodied as any type of server (e.g., a web server, etc.) or similar computing device capable of performing the functions described herein. In the illustrative embodiment of FIG. 2 the server 220 includes a processor 228, an I/O subsystem 226, a memory/data storage 224, communication circuitry 232, and one or more peripheral devices 222. Components of the server 220 may be similar to the corresponding components of the processing device 202, the description of which is applicable to the corresponding components of server 220 and is not repeated herein for the purposes of brevity.

The communication circuitry 232 of the server 220 may include any number of devices and circuitry for enabling communications between the server 220 and the processing device 202. In some embodiments, the server 220 may also include one or more peripheral devices 222. Such peripheral devices 222 may include any number of additional input/output devices, interface devices, and/or other peripheral devices commonly associated with a server or computing device. In some illustrative embodiments, the server 220 also includes a system biometric data manager 230 and decision module 234. The system biometric data manager 230 may be configured similarly to biometric manager 214 of device 202, except that system biometric data manager 230 may be configured to manage processing of biometric data in a plurality of device within a network. In some illustrative embodiments, system biometric data manager 230 may communicate with each biometric manager (e.g., 214) of each device (e.g., 202) to receive and transmit data relating to biometric data processing, password and/or key generation. Decision module 234 may be configured to perform verification processing with respect to biometric data and/or templates, as described in greater detail below. Those skilled in the art will understand that the functions of system biometric data manager 230 and decision module 234 may be incorporated into device 202 to function independently.

In the illustrated embodiment, communication between the server 220 and the processing device 202 takes place via the network 106 that may be operatively coupled to one or more network switches (not shown). In one embodiment, the network 106 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 202 and the communication circuitry 232 of the server 220 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 106 may include any number of additional devices, such as additional computers, routers, and switches, to facilitate communications between the processing device 202 and the server 220.

Figure 3:
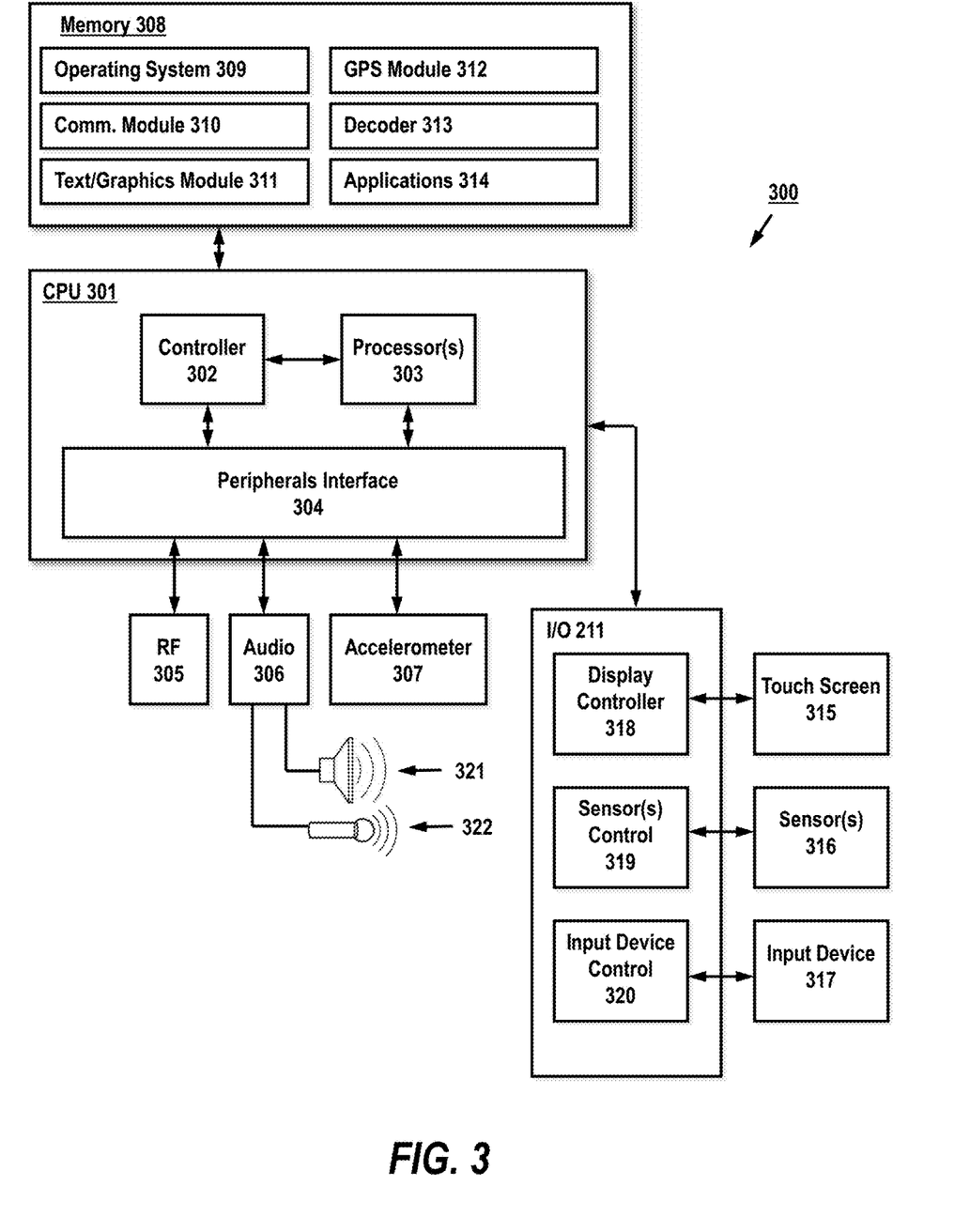
FIG. 3 schematically illustrates an operating environment for a processing device configured to perform biometric processing under an illustrative embodiment.

FIG. 3 is an exemplary embodiment of a computing device 300 (such as processing devices 108, 110), and may be a personal computer, smart phone, tablet computer, laptop and the like. Device 300 may include a central processing unit (CPU) 301 (which may include one or more computer readable storage mediums), a memory controller 302, one or more processors 303, a peripherals interface 304, RF circuitry 305, audio circuitry 306, accelerometer 307, speaker 321, microphone 322, and input/output (I/O) subsystem 221 having display controller 318, control circuitry for one or more sensors 319 and input device control 320. These components may communicate over one or more communication buses or signal lines in device 300. It should be appreciated that device 300 is only one example of a portable multifunction device, and that device 300 may have more or fewer components than shown, may combine two or more components, or a may have a different configuration or arrangement of the components. The various components shown in FIG. 3 may be implemented in hardware or a combination of hardware and software, including one or more signal processing and/or application specific integrated circuits.

Memory (or storage) 308 may include high-speed random access memory (RAM) and may also include non-volatile memory, such as one or more magnetic disk storage devices, flash memory devices, or other non-volatile solid-state memory devices. Access to memory 308 by other components of the device 300, such as processor 303, and peripherals interface 304, may be controlled by the memory controller 302. Peripherals interface 304 couples the input and output peripherals of the device to the processor 303 and memory 308. The one or more processors 303 run or execute various software programs and/or sets of instructions stored in memory 308 to perform various functions for the device 300 and to process data. In some embodiments, the peripherals interface 304, processor(s) 303, decoder 313 and memory controller 302 may be implemented on a single chip, such as a chip 301. In other embodiments, they may be implemented on separate chips.

RF (radio frequency) circuitry 305 receives and sends RF signals, also known as electromagnetic signals. The RF circuitry 305 converts electrical signals to/from electromagnetic signals and communicates with communications networks and other communications devices via the electromagnetic signals. The RF circuitry 305 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 305 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 306, speaker 321, and microphone 322 provide an audio interface between a user and the device 300. Audio circuitry 306 may receive audio data from the peripherals interface 304, converts the audio data to an electrical signal, and transmits the electrical signal to speaker 321. The speaker 321 converts the electrical signal to human-audible sound waves. Audio circuitry 306 also receives electrical signals converted by the microphone 321 from sound waves, which may include utterances from a speaker. The audio circuitry 306 converts the electrical signal to audio data and transmits the audio data to the peripherals interface 304 for processing. Audio data may be retrieved from and/or transmitted to memory 308 and/or the RF circuitry 305 by peripherals interface 304. In some embodiments, audio circuitry 306 also includes a headset jack for providing an interface between the audio circuitry 306 and removable audio input/output peripherals, such as output-only headphones or a headset with both output (e.g., a headphone for one or both ears) and input (e.g., a microphone).

I/O subsystem 221 couples input/output peripherals on the device 300, such as touch screen 315, sensors 316 and other input/control devices 317, to the peripherals interface 304. The I/O subsystem 221 may include a display controller 318, sensor controllers 319, and one or more input controllers 320 for other input or control devices. The one or more input controllers 320 receive/send electrical signals from/to other input or control devices 317. The other input/control devices 317 may include physical buttons (e.g., push buttons, rocker buttons, etc.), dials, slider switches, joysticks, click wheels, and so forth. In some alternate embodiments, input controller(s) 320 may be coupled to any (or none) of the following: a keyboard, infrared port, USB port, and a pointer device such as a mouse, an up/down button for volume control of the speaker 321 and/or the microphone 322. Touch screen 315 may also be used to implement virtual or soft buttons and one or more soft keyboards.

Touch screen 315 provides an input interface and an output interface between the device and a user. Display controller 318 receives and/or sends electrical signals from/to the touch screen 315. Touch screen 315 displays visual output to the user. The visual output may include graphics, text, icons, video, and any combination thereof. In some embodiments, some or all of the visual output may correspond to user-interface objects. Touch screen 315 has a touch-sensitive surface, sensor or set of sensors that accepts input from the user based on haptic and/or tactile contact. Touch screen 315 and display controller 318 (along with any associated modules and/or sets of instructions in memory 308) detect contact (and any movement or breaking of the contact) on the touch screen 315 and converts the detected contact into interaction with user-interface objects (e.g., one or more soft keys, icons, web pages or images) that are displayed on the touch screen. In an exemplary embodiment, a point of contact between a touch screen 315 and the user corresponds to a finger of the user. Touch screen 215 may use LCD (liquid crystal display) technology, or LPD (light emitting polymer display) technology, although other display technologies may be used in other embodiments. Touch screen 315 and display controller 318 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 315.

Device 300 may also include one or more sensors 316 that may include a biometric capture device (e.g., 104). Sensors 316 may also include additional sensors, such as heart rate sensors, touch sensors, optical sensors that comprise charge-coupled device (CCD) or complementary metal-oxide semiconductor (CMOS) phototransistors. The optical sensor may capture still images or video, where the sensor is operated in conjunction with touch screen display 315. Device 300 may also include one or more accelerometers 307, which may be operatively coupled to peripherals interface 304. Alternately, the accelerometer 307 may be coupled to an input controller 320 in the I/O subsystem 221. The accelerometer is preferably configured to output accelerometer data in the x, y, and z axes.

In some illustrative embodiments, the software components stored in memory 308 may include an operating system 309, a communication module 310, a text/graphics module 311, a Global Positioning System (GPS) module 312, decoder 313 and applications 314. Operating system 309 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 310 facilitates communication with other devices over one or more external ports and also includes various software components for handling data received by the RF circuitry 305. An external port (e.g., Universal Serial Bus (USB), Firewire, etc.) may be provided and adapted for coupling directly to other devices or indirectly over a network (e.g., the Internet, wireless LAN, etc.).

Text/graphics module 311 includes various known software components for rendering and displaying graphics on the touch screen 315, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 312 determines the location of the device and provides this information for use in various applications. Applications 314 may include various modules, including health monitoring software, sensor software, navigation software, mapping, address books/contact list, email, instant messaging, and the like. In some illustrative embodiments, Applications 314 may communicate with sensors 316, configured as a biometric capture device 104, and in turn communicate with biometric manager 214 of FIG. 2, which may be incorporated as part of Applications 314.

Figure 4:
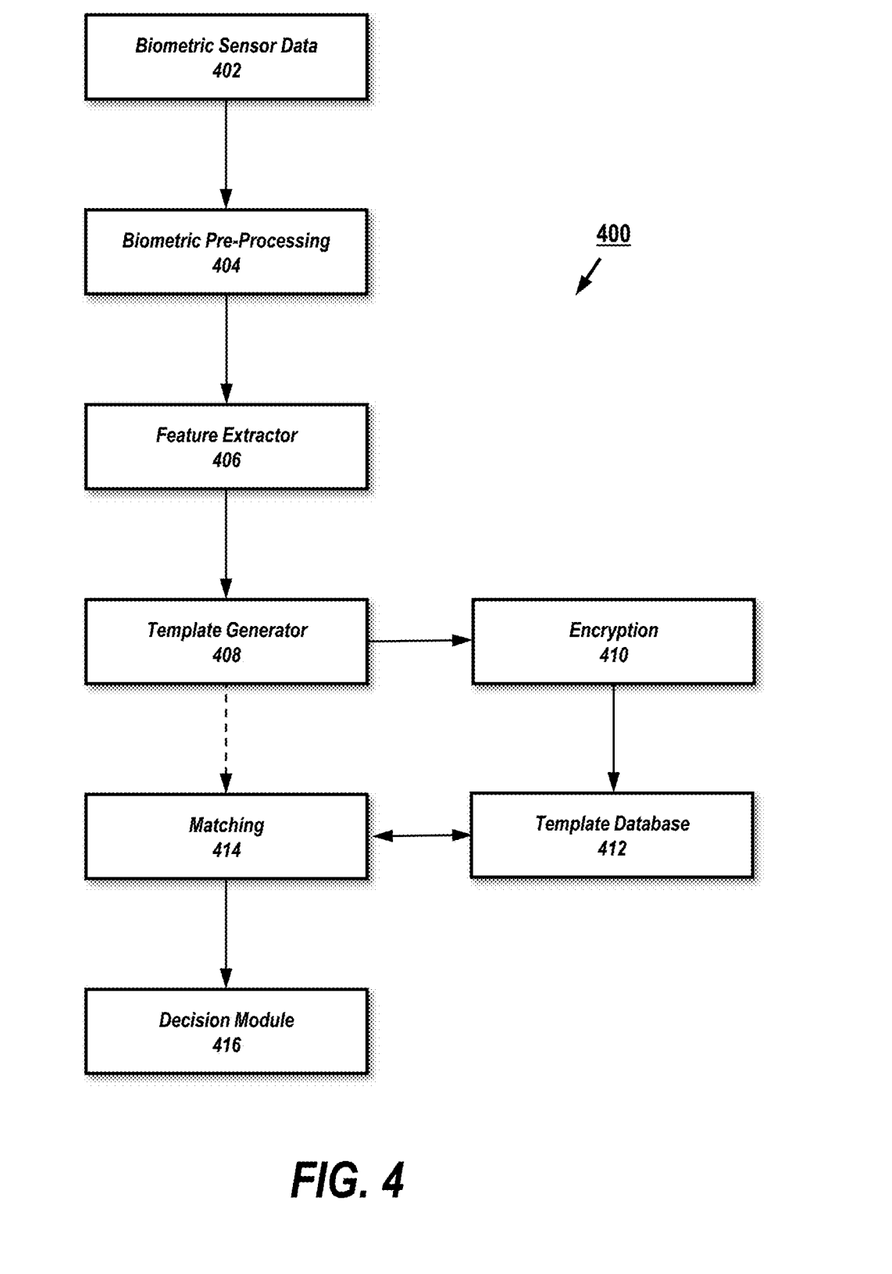
FIG. 4 shows a process for processing biometric data to generate biometric templates for generating passwords and cryptographic keys under an illustrative embodiment.

Turning to FIG. 4, the drawing shows a process 400 for processing biometric data to generate biometric templates for generating passwords and cryptographic keys under an illustrative embodiment. In block 402 a biometric sensor or (i.e. capture device) generates raw biometric sensor data and proceeds to block 404 in which a processor (e.g., 210, 301) performs pre-processing on the biometric data that may include, but is not limited to, filtering, quantization, and the like. In block 406, the processor performs feature extraction on the pre-processed data and proceeds to generate a biometric template in block 408. Additionally, the processor may convert the biometric template into a data string, as discussed above.

In some illustrative embodiments, biometric templates generated in block 408 may be transmitted for matching in block 414. In a preferred embodiment, biometric templates generated in block 408 are subjected to encryption in block 410. Suitable encryption algorithms include, but are not limited to, Data Encryption Standard (DES) algorithms, RSA, Blowfish, Twofish, and Advanced Encryption Standard (AES) algorithms. After encryption, the secured biometric template, and associated data is stored in a template database in block 412 (e.g., 206, 224, 308). In matching block 414, subsequent biometric templates from block 408 are matched with biometric templates from block 412, where decision module in block 416 determines is a match exists.

Figure 5:
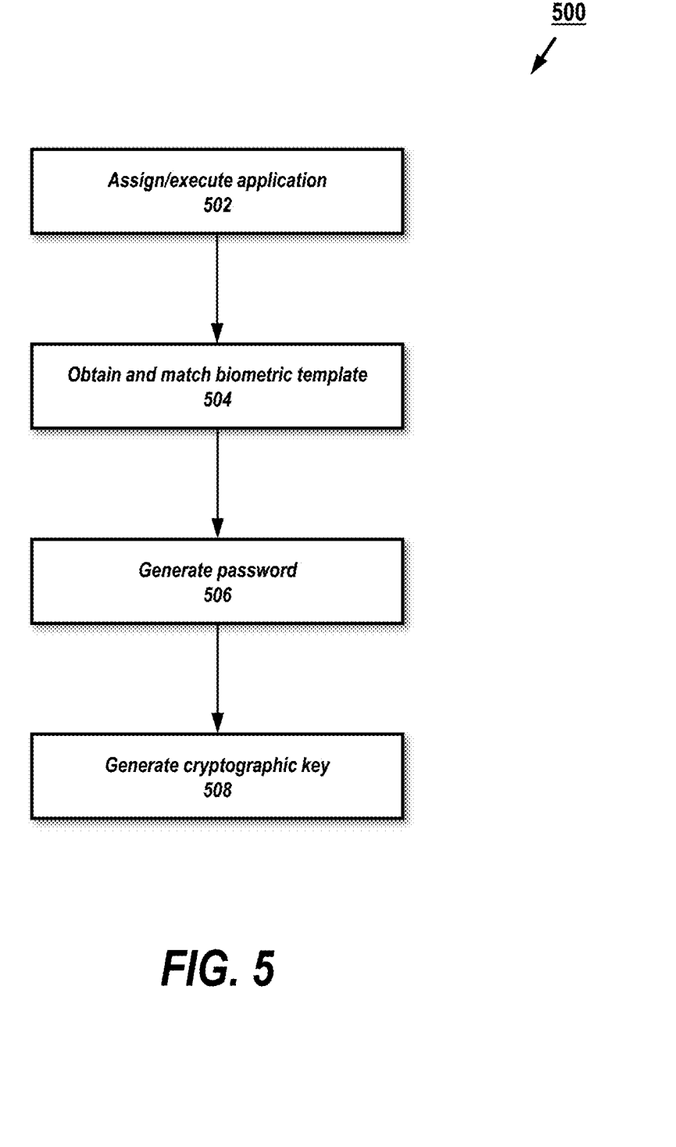
FIG. 5 shows a process for generating a password and a cryptographic key from a biometric template under an illustrative embodiment.

FIG. 5 shows a process 500 for generating a password and a cryptographic key from a biometric template under an illustrative embodiment. In block 502, a processing device assigns an application for biometric processing under the present disclosure and executes the application. In some illustrative embodiments, the application assignment is performed on the device (e.g., 300), in order to obviate the need to modify software in the executed application itself for biometric processing. Additionally, the application assignment according to the present disclosure allows for biometric processing regardless of whether or not the application itself is configured for biometric processing, and further allows for application assignment where the application is being executed remotely, such as in a computer network, cloud server or a distributed computer system. The assignment may be configured within a processing device's operating system (e.g., 309), or may be configured as a separate application (e.g., 314) that processes the assignment on the device. In block 504, the processor (e.g., 210, 301) obtains and matches a biometric template as described above. Once the biometric template is matched, the processor may be configured to generate one or more passwords in block 506 that are associated with the assigned application, in effectively linking the one or more passwords to the biometric template.

In some illustrative embodiments, the passwords generated in block 506 may be subjected to format processing via the processor to comply with password formatting that may exist for the linked application. This formatting may be programmed via the biometric manager 214, or via another application (e.g., 314). When generating the password in block 506, the password may be generated using a specific formatting, such as alphanumeric passwords, wherein the passwords are further formatted to meet specific requirements for the linked application. These requirements include, but are not limited to, use of capital letters, numbers, symbols, etc., that must be used in the password.

Similarly, the processor may generate one or more cryptographic keys for the biometric template in block 508. Here, the cryptographic keys of block 508 may be directly associated with the generated password from block 506, or may be independent of the password. If the key is directly associated with the password, the key is transmitted together with the password each time a biometric authentication is required for the application. If the key is independent of the password, the key is not transmitted concurrently with the password for the application, but may be transmitted before or after the password is auto-filled into the application after biometric authentication. In some illustrative embodiments, a plurality of cryptographic keys may be generated in block 508 and associated with the password generated in block 506. In this example, each of the plurality of keys may be associated with individual activations, executions and/or sessions of the application. For example, upon initial execution of an application, the biometric authentication generates a password that is auto-filled into the application, allowing the user to provisionally execute and/or access the application. In addition, the biometric authentication may generate a plurality of keys (e.g., eight), wherein one key is used each time the application is executed/accessed. Each time the user exits the application and then re-executes the application, another key is transmitted, until the generated keys run out. At that point, the user would be required to provide biometric authentication again to generate a new plurality of keys.

Figure 6:
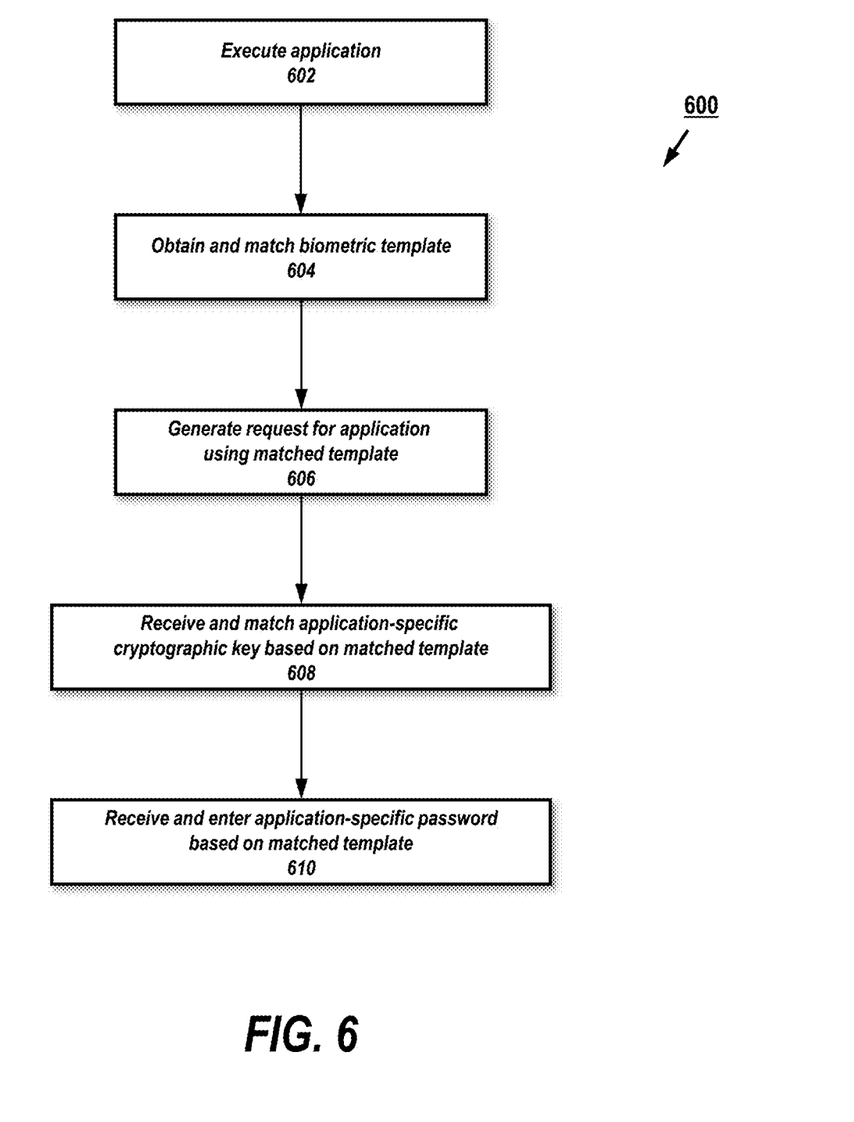
FIG. 6 shows a process for receiving and entering a biometrically-linked key and password for an application-specific environment under an illustrative embodiment.

FIG. 6 shows a process 600 for receiving and entering a biometrically-linked key and password for an application-specific environment under an illustrative embodiment. In block 602, an application (e.g., 314) is executed, which prompts the processor to obtain and match a biometric template from the database (e.g., 412) in block 604. Prior to application usage, the processor (e.g., 210, 301) generates a request for application access using the matched template in block 604. In block 608, the processor receives and matches the application-specific cryptographic key based on the matched template. In block 610, the processor automatically enters the application-specific password derived from the matched template.

Figure 7A:
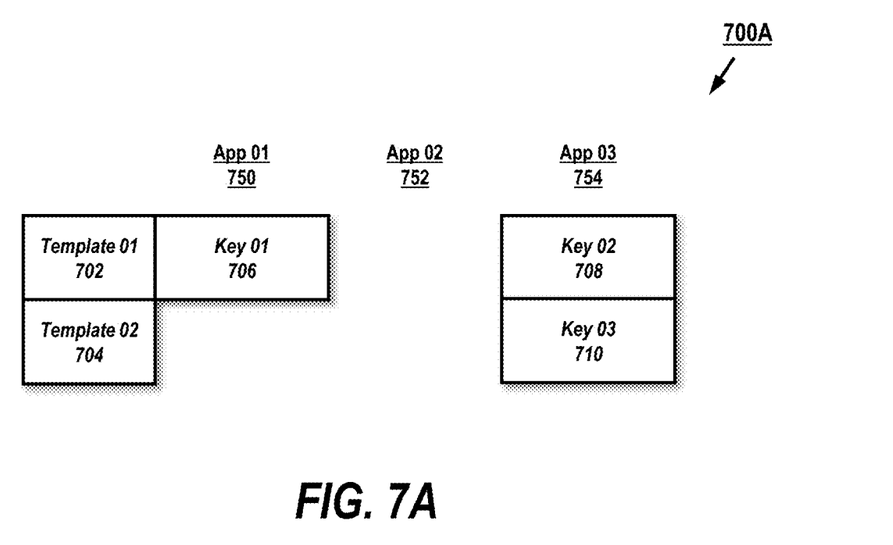
FIGS. 7A-7B show operating environments for linking biometric templates to passwords and keys under an illustrative embodiment.
Figure 7B:
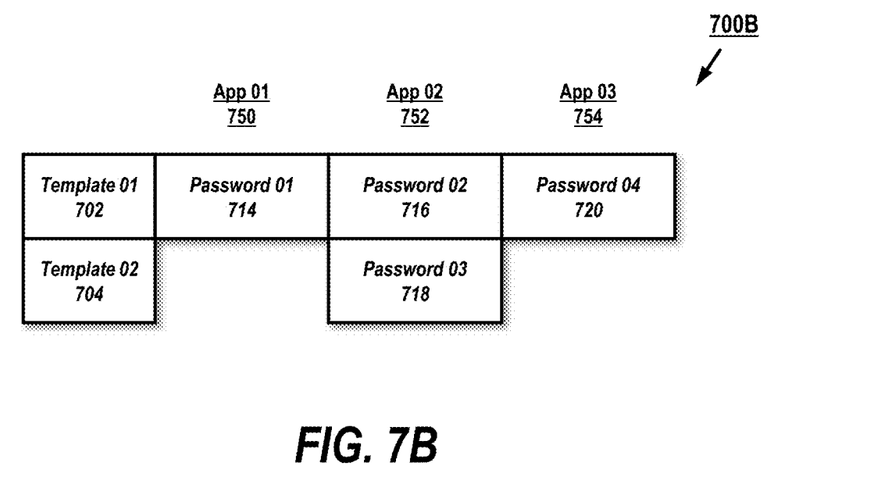

FIGS. 7A-7B show operating environments (700A, 700B) for linking biometric templates to passwords and keys under an illustrative embodiment. In FIG. 7A, the figure shows an operating environment 700A, wherein two biometric templates (702, 702) are associated with three applications (75, 752, 754). In one example, the first template 702 may be data associated with a fingerprint in a first orientation, and the second template 704 fingerprint is data associated with the fingerprint in a second orientation. In other examples, the first and second templates (702, 704) may be data associated with different fingers, or biometric data of different formats (e.g., fingerprint, voice, iris, etc.). As can be seen in the figure, the first biometric template 702 produces two cryptographic keys 706, 708 associated with the first application 750 and third application 754, and no key is generated with respect to the second application 752. The second biometric template 704 produces a key 710 associate with the third application, but produces no keys for the first application 750 and second application 752.

Turning now to FIG. 7B, the figure shows operating environment 700B for the same biometric templates 702, 704 for the same applications 750, 752, 754, and illustrates the passwords generated from each biometric template (702, 704), in addition to the keys generated in 700A. Here, the first biometric template 702 generates three passwords 714, 716, 720 respectively for the first application 750, second application 752 and third application 754. The second biometric template 704 generates a password 718 for the second application, but produces no passwords for the first application 750 and third application 754.

Under the disclosed configuration, computer systems may be secured for users using biometric data, wherein the biometric data provides a multi-layered level of security and provides flexibility for providing application access to users. Additionally, the configurations disclosed herein provide simple access for users in that they do not require to remember passwords. Thus, for the first application 750, a user associated with the first biometric template 702 would have access to, or be able to execute the application since the user is authorized via the key 706 and password 714. For the second application 752, the application may be configured without cryptographic requirements, thus, the system does not produce keys for this application and generates unique passwords (716, 718) to give users of the first (702) and second (704) template access to the application. For the third application 754, the user associated with the first biometric template 702 has full access by virtue of the key 708 and password 720. However, for the user associated with the second biometric template 704, only a key (710) is generated. Here, the system (e.g., 100) may be configured to give the user only partial access to the application (754) (e.g., view-only) by virtue of the key 710. Of course, the configuration may be modified by the system designer depending on the application, where, for example, users with passwords, but without keys, are limited in their access. Thus, in the example of the second application 752, both of the users associated with the first and second templates (702, 704), would have access to the application, but would be limited to partial access on account of not having an associated cryptographic key.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. It is understood by those skilled in the art that the present disclosure do The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for biometrically authenticating a user, comprising:
   a biometric capture device configured to generate user biometric data;
   a processor, operatively coupled to the biometric capture device, wherein the processor is configured to process user biometric data from the biometric capture device to generate one or more biometric templates;
   an application module, configured to store a plurality of different executable applications having respective cryptographic keys or passwords formatted independently for each of the plurality of executable applications associated with the user;
   a memory, operatively coupled to the processor, wherein the memory is configured to store the one or more biometric templates and one or more previously generated biometric templates, and wherein the memory is configured to store the respective cryptographic keys or passwords formatted independently for each of the plurality of executable applications associated with the user; and
   a biometric manager module, wherein the biometric manager module is configured to associate each of the plurality of executable applications with one of the one or more biometric templates,
   wherein the processor is configured to match one of the one or more biometric templates with one of the one or more previously generated biometric templates to determine if the matched biometric template is associated with the executable application,
   and wherein the processor is configured to automatically generate at least one of a password and/or a cryptographic key from the memory, the at least one of a password and/or a cryptographic key being formatted for allowing access by the user to at least one of the plurality of different executable applications, but not allowing access to another one of the plurality of different executable applications associated by the biometric manager module, based on the matched biometric template.

2. The apparatus of claim 1, wherein the password comprises an alphanumeric password.

3. The apparatus of claim 2, wherein the processor is configured to format the alphanumeric password to conform to a password format requirement for the associated executable application.

4. The apparatus of claim 1, wherein the generated password is configured to provide a first level of access to the associated application, and the cryptographic key is configured to provide a second level of access to the associated executable application.

5. The apparatus of claim 4, wherein the first level of access and the second level of access is different.

6. The apparatus of claim 1, wherein the processor is configured to process user biometric data by representing feature vectors of the biometric templates as binary strings.

7. The apparatus of claim 1, further comprising communications circuitry configured to communicate data from the associated executable application to a computer network.

8. A method for biometrically authenticating a user for an apparatus, comprising:
generating user biometric data via a biometric capture device;
processing, via a processor, user biometric data from the biometric capture device to generate one or more biometric templates;
storing, in a memory, the one or more biometric templates and one or more previously generated biometric templates;
storing, in the memory, the respective cryptographic keys or passwords formatted independently for each of the plurality of executable applications associated with the user;
associating, via a biometric manager module, a plurality of different executable applications for the apparatus with one of the one or more biometric templates wherein each of the different executable applications are configured with respective cryptographic keys or passwords independently formatted for each of the plurality of executable applications associated with the user;
matching, via the processor, one of the one or more biometric templates with one of the one or more previously generated biometric templates to determine if the matched biometric template is associated with the executable application; and
automatically generating, via the processor, at least one of a password and/or a cryptographic key from the memory, the at least one of a password and/or a cryptographic key being formatted for allowing access by the user to at least one of the plurality of different executable applications, but not allowing access to another one of the plurality of different executable applications associated by the biometric manager module, based on the matched biometric template.

9. The method of claim 8, wherein the password comprises an alphanumeric password.

10. The method of claim 9, further comprising formatting, via the processor, the alphanumeric password to conform to a password format requirement for the associated executable application.

11. The method of claim 8, wherein the generated password is configured to provide a first level of access to the associated application, and the cryptographic key is configured to provide a second level of access to the associated executable application.

12. The method of claim 11, wherein the first level of access and the second level of access is different.

13. The method of claim 8, wherein processing the user biometric data comprises representing feature vectors of the biometric templates as binary strings.

14. The method of claim 8, further comprising communicating data, via communications circuitry, from the associated executable application to a computer network.

15. A system for biometrically authenticating a user, comprising:
a biometric capture device configured to generate user biometric data;
a processor, operatively coupled to the biometric capture device, wherein the processor is configured to process user biometric data from the biometric capture device to extract feature vectors of the biometric templates and convert the vectors for form binary strings to generate one or more biometric templates therefrom;
an application module, configured to store a plurality of different executable applications, wherein the application module is further configured to store associated cryptographic keys or passwords independently formatted for each of the plurality of executable applications associated with the user, wherein at least one of the plurality of different executable applications is configured to require an associated cryptographic key or password, but not require biometric data, for access;
a memory, operatively coupled to the processor, wherein the memory is configured to store the one or more biometric templates and one or more previously generated biometric templates, and wherein the memory is configured to store the respective cryptographic keys or passwords formatted independently for each of the plurality of executable applications associated with the user; and
a biometric manager module, wherein the biometric manager module is configured to associate each of the executable applications with one of the one or more biometric templates,
wherein the processor is configured to match one of the one or more biometric templates with one of the one or more previously generated biometric templates to determine if the matched biometric template is associated with the executable application,
and wherein the processor is configured to automatically generate at least one of a password and/or a cryptographic key from the memory, the at least one of a password and/or a cryptographic key being formatted for allowing access by the user to the executable applications associated by the biometric manager module, including the at least one of the plurality of different executable applications configured to require an associated cryptographic key or password, but not require biometric data, for access, based on the matched biometric template.

16. The apparatus of claim 15, wherein the password comprises an alphanumeric password.

17. The apparatus of claim 16, wherein the processor is configured to format the alphanumeric password to conform to a password format requirement for the associated executable application.

18. The apparatus of claim 15, wherein the generated password is configured to provide a first level of access to the associated application, and the cryptographic key is configured to provide a second level of access to the associated executable application.

19. The apparatus of claim 18, wherein the first level of access and the second level of access is different.

20. The apparatus of claim 15, further comprising communications circuitry configured to communicate data from the associated executable application to a computer network.

* * * * *